United States Patent
Hayden, Sr.

Patent Number: 6,119,571
Date of Patent: *Sep. 19, 2000

[54] SAWBLADE HAVING UNEQUAL SPACING BETWEEN IDENTICAL TOOTH GROUPS

[75] Inventor: Robert C. Hayden, Sr., Branford, Conn.

[73] Assignee: Sandvik Aktiebolag, Sandviken, Sweden

[*] Notice: This patent issued on a continued prosecution application filed under 37 CFR 1.53(d), and is subject to the twenty year patent term provisions of 35 U.S.C. 154(a)(2).

[21] Appl. No.: 09/058,358
[22] Filed: Apr. 10, 1998
[51] Int. Cl.⁷ .................................................. B23D 55/00
[52] U.S. Cl. ................................................ 83/661; 83/848
[58] Field of Search .............................. 83/661, 848, 851, 83/852, 846, 838, 835, 849, 850

[56] References Cited

U.S. PATENT DOCUMENTS

| | | |
|---|---|---|
| 14,305 | 2/1856 | Coffin ........................................ 83/846 |
| 81,413 | 8/1868 | Sattler . |
| 82,289 | 9/1868 | Burgess . |
| 154,104 | 8/1874 | Vosburgh . |
| 566,865 | 9/1896 | Morrish ..................................... 83/846 |
| 869,182 | 10/1907 | Hotchkiss ................................. 83/848 |
| 2,568,870 | 9/1951 | Ronan ....................................... 83/846 |
| 4,179,967 | 12/1979 | Clark ..................................... 83/661 X |
| 4,311,075 | 1/1982 | Sundstrom ............................... 83/848 |
| 4,557,172 | 12/1985 | Yoneda ................................... 83/848 |
| 4,827,822 | 5/1989 | Yoshida et al. . |
| 5,477,763 | 12/1995 | Kullman ............................... 83/851 X |
| 5,606,900 | 3/1997 | Stoddard ............................... 83/851 X |

*Primary Examiner*—Kenneth E. Peterson
*Attorney, Agent, or Firm*—Burns, Doane, Swecker & Mathis, L.L.P.

[57] ABSTRACT

A bandsaw blade includes recurring identical groups of teeth. Each tooth group consists of two to six teeth. Each group is spaced from leading and trailing groups by first and second respective distances. The first and second distances being different from one another.

5 Claims, 1 Drawing Sheet

Fig. 1
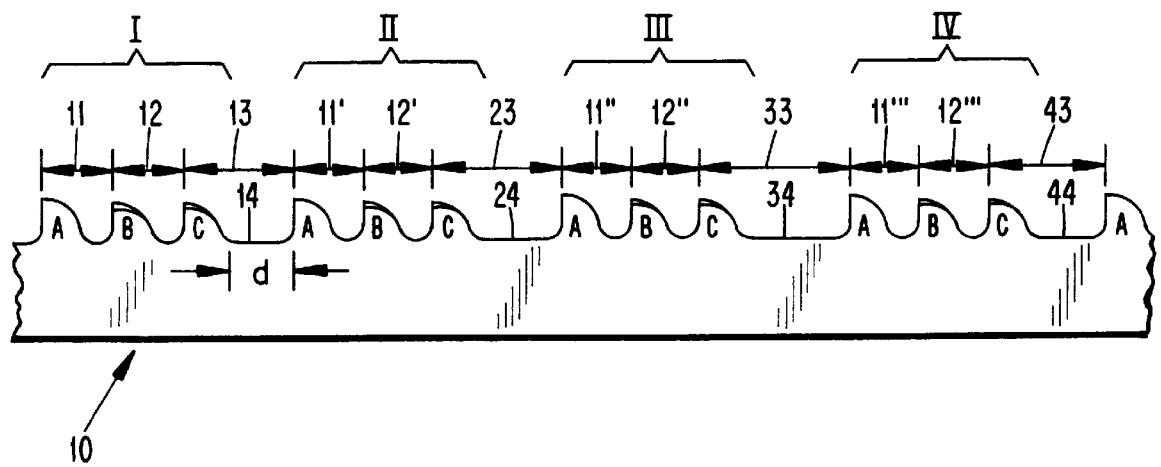
Fig. 2
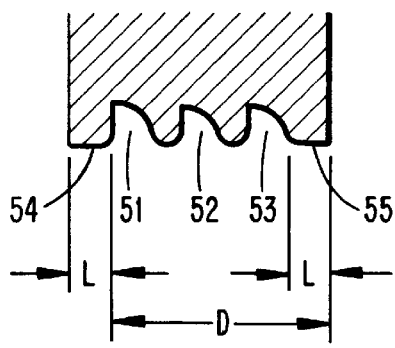
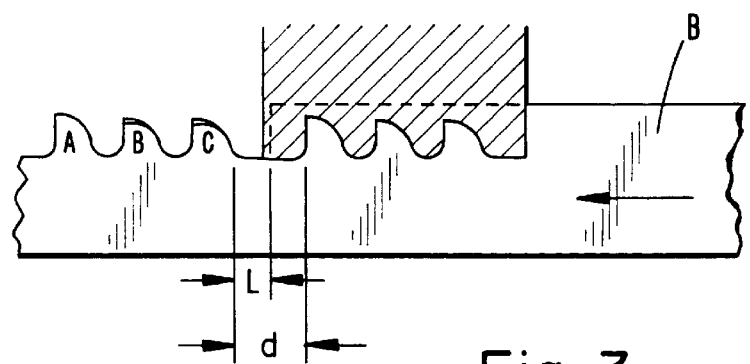
Fig. 3

SAWBLADE HAVING UNEQUAL SPACING BETWEEN IDENTICAL TOOTH GROUPS

BACKGROUND OF THE INVENTION

It has long been known that bandsaws for sawing thick metal should preferably have teeth with different pitch distances, to avoid vibration and corrugation of the cut sides. For reasons related to production and maintenance of the sawblade, the teeth are produced in recurrent groups, with variations of pitch distances, setting and height within the groups.

It is also known that in general the vibration damping and the cutting ability are best if each of the recurrent groups consists of a large number of teeth, often seven or more teeth.

In the production of the sawblade the first operation is milling simultaneously the whole tooth group with the desired pitch distance and height. Very long recurrent groups will then require large milling cutters, heavy milling machinery and very strong clamping of the sawblade.

It is also known from FIGS. 15a–c of U.S. Pat. No. 4,827,822 that a longer group for the total variation of height, pitch and setting van be provided by combining one shorter variation of height and pitch with another short but different variation of setting. In the cited instance, it is known to combine a three member height and pitch variation with two member setting variation to produce a three times two=six member total period. This example can be extended to larger numbers, the total period being the height and pitch variation period times the setting variation period. Having a long total period is also previously known to be beneficial to reduce the vibrations, but doing it as shown in Amada '822 makes it difficult to do the setting with desired precision unless the setting is done either one tooth at a time, which is a slow method, or for the whole total period which may need large expensive setting anvils and hammers. It would be advantageous if the setting could be done with anvils and hammers covering just the length of the setting variation, but because in Amada '822 the height difference and pitch distance between the two teeth to be set at a time would be different each time, the precision would be insufficient and the saw efficiency would suffer.

SUMMARY OF THE INVENTION

The present invention concerns a bandsaw blade with short recurrent tooth groups which are identical, e.g., where the number and types of teeth, the pitch distances, the heights and the setting are equal from one group to another, but wherein the same effect as a blade having very long recurrent groups is achieved by varying the intervals between the short groups. This allows setting of the teeth with higher capacity and precision.

BRIEF DESCRIPTION OF THE DRAWING

A preferred embodiment of a bandsaw blade according to the invention is described with reference to FIG. 1 which shows a side view of the blade, FIG. 2 which shows a tool for producing such a sawblade, and FIG. 3 which depicts a manufacturing step.

DETAILED DESCRIPTION OF A PREFERRED EMBODIMENT OF THE INVENTION

Depicted in FIG. 1 is a bandsaw blade 10 having cutting teeth. The teeth are arranged in the form of recurring identical groups. Each group comprises the same number of teeth in the range from two to six, i.e., three teeth (A, B, C) in the depicted preferred embodiment. FIG. 1 depicts four of the groups (I–IV) each consisting of three teeth with pitch distances measured between tooth tips of successive teeth. The tip distances may be different within the group, but are the same from each group to the next. Thus, the pitches (11, 12) in the first depicted group I of teeth may be different from one another, but are the same from each group to the next. Accordingly, the pitches (11, 11', 11", 11''') in all groups are the same, and the pitches (12, 12', 12", 12''') in all groups are identical, but the pitch (11) need not be equal to the pitch (12), etc. This makes it possible to have a simple punching, grinding or milling tool producing one group of teeth for each machine cycle, as shown in FIG. 2.

On the sawblade, the inter-group pitch distance (13,23, 33,43) between the last tooth in one group and the first tooth in the following group is varied along the blade, randomly or according to a predetermined scheme, whereby each group is spaced from leading and trailing groups by different distances. Thus, for example, the group (III) trails the leading group (II) by distance (23), and leads the following group (IV) by a distance (33) of different magnitude than distance (23).

Each pair of successive groups is separated by a gullet having a flat portion whose length is at least equal to a difference between the longest and shortest of the distances between successive groups, and no more than two times such difference. The front and rear slopes of the teeth are constant and determined by the punching or milling tool, and the difference in inter-group pitch distance is achieved by varying the length d of the flat gullet bottom (14,24,34,44). To do this, the blade blank is fed forward by different amounts between machine cycles during production.

The production tool can be a grinding wheel, a milling cutter or a punch, and is made with grooves (51,52,53) representing the teeth of each group, and flat stretches (54,55) in front and rear of the tooth group. The flat stretches should have basically the same length L, and by suitable overlapping steps, flat gullet bottoms can be produced with lengths between one and two times the length of a flat stretch. For example, referring to FIG. 3, after a set of teeth A, B, C is formed, the blank B can be advanced by a distance greater than D (FIG. 2) whereby a length d of a flat gullet bottom between successive groups is formed which is greater than the length L of the flat stretch 54 or 55. By varying the amount of blank advancement between successive group-forming steps, the lengths of the flat gullet bottoms, i.e., the spacing between successive groups, can be varied. The length of each flat stretch (54, 55) should be at least equal to the difference between the longest and the shortest of the inter-group pitch distances (14–44). If desired, two consecutive tools can be used to produce the rake and clearance faces separately in order to get a sharper edge, or one tool twice with a short displacement in between.

The forward feed between machine cycles may be varied to produce varying inter-group pitch distances (13,23,33,43) between groups. However, the inter-group pitch distances should not be equal to multiples of the average pitch distance within the group, since that would cause vibrations. That is, the distances 13, 23, 33, 43 should not be a multiple of one-half of the sum of 11+12.

A sawblade according to the invention can be easily set with high precision in either of two ways. If setting is done the traditional way, i.e., one tooth at a time, while indexing on a preceding tooth, preferably the leading tooth, and if the number of teeth set in each direction within the recurring groups is only one, then the distance between the index and setting hammer is constant and can be accurately adjusted. The same holds true if the group contains two teeth set in respective directions and the pitch distances are equal within the group, i.e., the same indexing can be used.

If setting is done simultaneously for the whole group of teeth by using a multiple setting hammer and indexing on the leading tooth, then a sawblade according to the invention allows a shorter group and a simpler smaller setting hammer, while obtaining the vibration damping characteristic of a much longer group.

Preferably, each of the recurrent groups should consist of three or four teeth, two of the teeth set to respective directions and one or two teeth being straight. If two straight teeth are provided in each group, the leading one of them should be higher than the other, and should have large chamfers.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A bandsaw blade comprising recurring groups of teeth, the teeth configured to cut in only one direction of blade travel, each group consisting of three to six teeth, the recurring groups being identical as to tooth size, tooth shape and tooth spacing within the group, a leading tooth of each group being spaced from a trailing tooth of a preceding group by a first distance, a trailing tooth of each group being spaced from a leading tooth of a following group by a second distance, the first and second distances being different from one another, the successive teeth of each group being separated by a gullet, and each pair of successive groups being separated by a gullet, all gullets of the blade being of substantially uniform depth.

2. The bandsaw blade according to claim 1 wherein each group of teeth defines an average pitch distance between the teeth, the average pitch distance being equal for all of the groups, the distances between successive groups being non-multiples of the average pitch distance.

3. The bandsaw blade according to claim 1 wherein a longest distance between successive groups is less than two times a shortest distance between successive groups.

4. The bandsaw blade according to claim 3 wherein each pair of successive groups is separated by a gullet having a flat portion whose length is at least equal to a difference between a longest and a shortest of those distances.

5. The bandsaw blade according to claim 1, wherein the distances between the groups are of random length.

* * * * *